Nov. 5, 1957 W. J. MELDAHL 2,812,083
TRACTOR HITCH ARM MOUNTING
Filed June 25, 1954 4 Sheets-Sheet 1
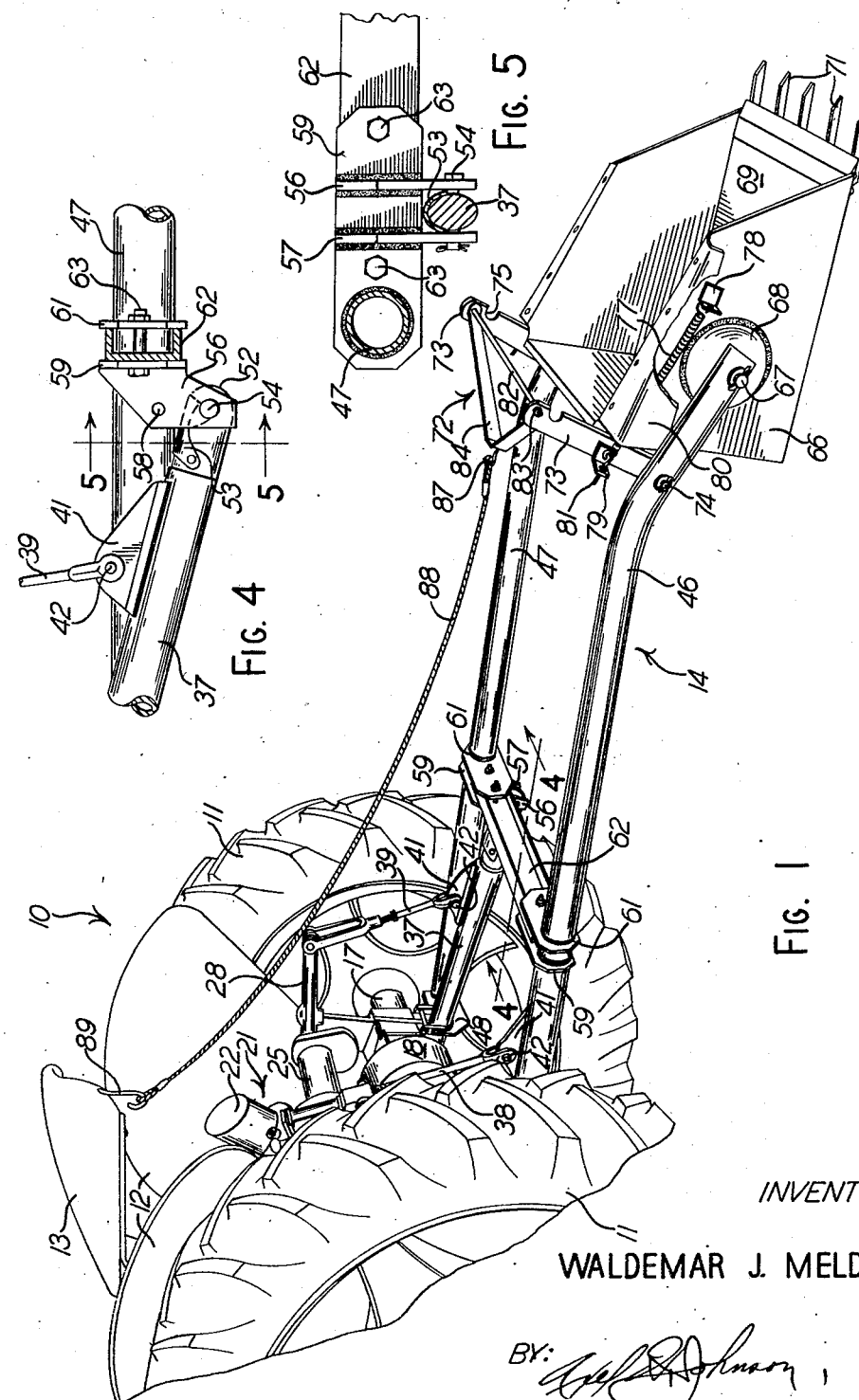
INVENTOR:
WALDEMAR J. MELDAHL
BY:
AGENT

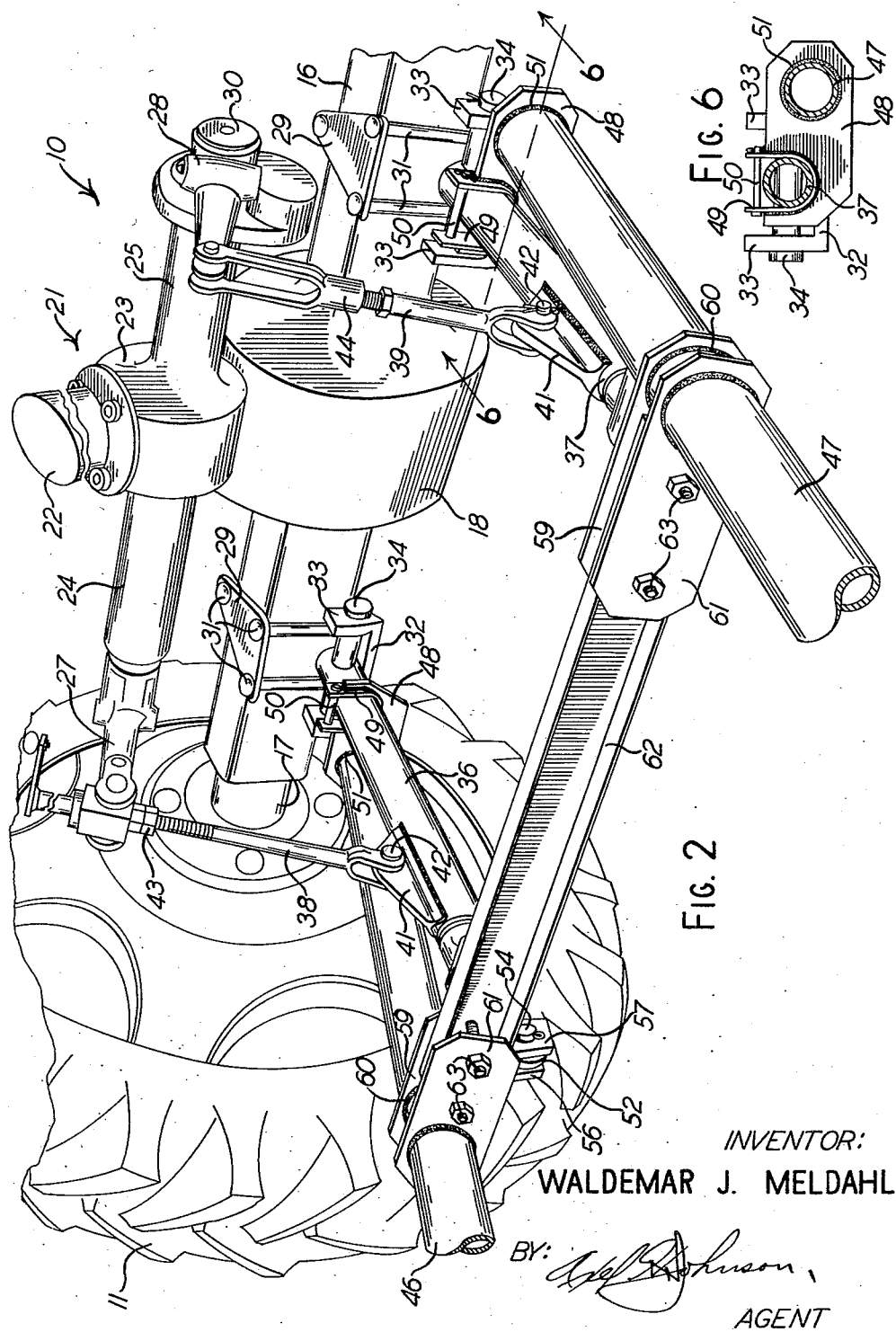
INVENTOR:
WALDEMAR J. MELDAHL
AGENT

Nov. 5, 1957  W. J. MELDAHL  2,812,083
TRACTOR HITCH ARM MOUNTING
Filed June 25, 1954  4 Sheets-Sheet 3
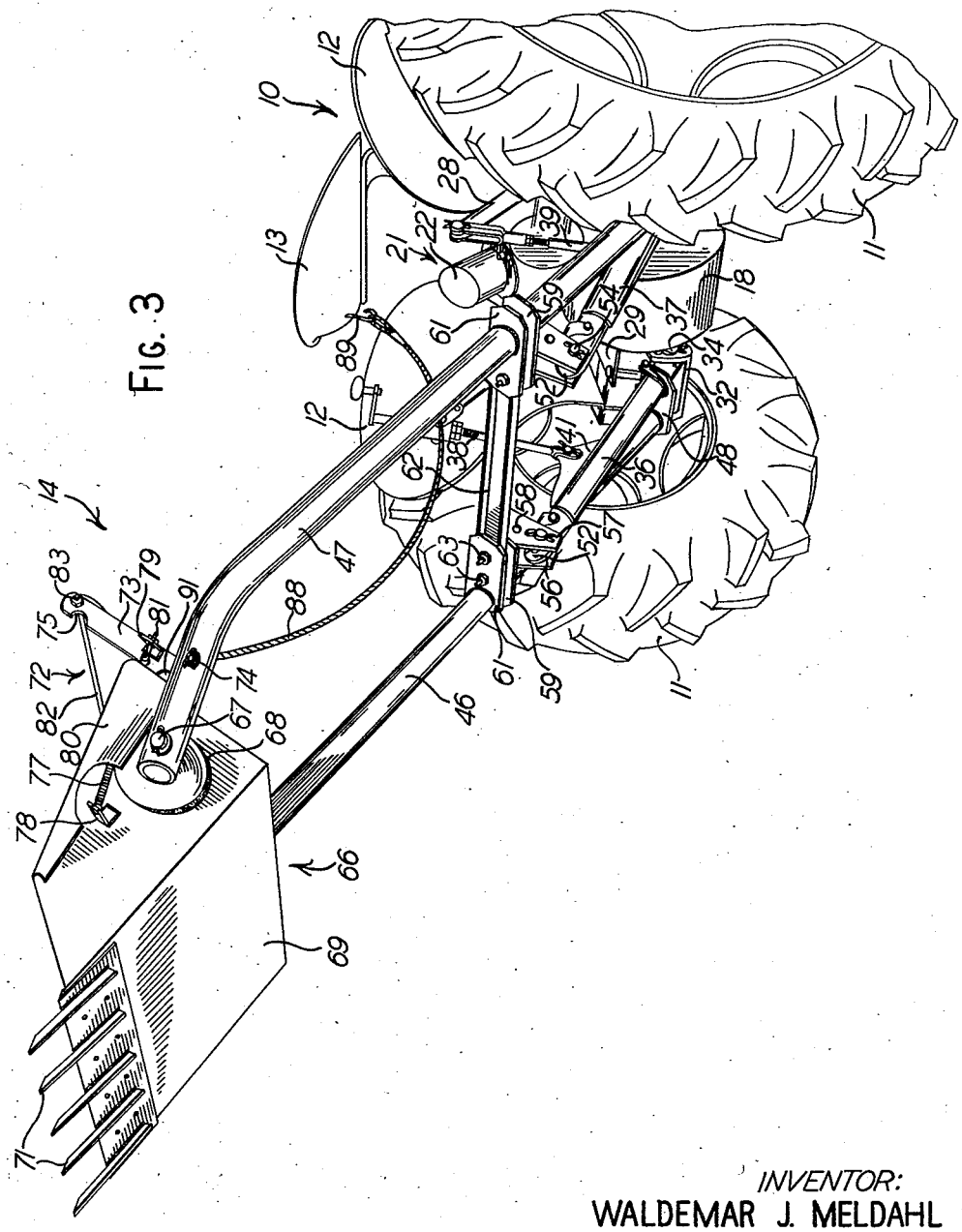
INVENTOR:
WALDEMAR J. MELDAHL
BY: *[signature]*
AGENT

INVENTOR:
WALDEMAR J. MELDAHL
BY: AGENT

United States Patent Office 2,812,083
Patented Nov. 5, 1957

2,812,083

TRACTOR HITCH ARM MOUNTING

Waldemar J. Meldahl, Racine, Wis., assignor to J. I. Case Company, Racine, Wis., a corporation of Wisconsin Application June 25, 1954, Serial No. 439,242

5 Claims. (Cl. 214—140)

This invention relates to a tractor, and, more particularly, it relates to a tractor hitch arm mounting suitable for effecting raising and lowering of a cantilever type of load on a tractor.

It is an object of this invention to provide a mounting on tractor hitch arms whereby cantilever types of loads can be handled by the tractor.

It is a further object of this invention to provide a simple but effective and durable tractor hitch arm mounting which provides for the handling of loads at an extended distance from the tractor.

A more specific object of this invention is to provide a tractor mounting which can be readily and easily attached to the hitch arms of a tractor for supporting a scoop, or the like, which can thereby be completely manipulated to dig, lift, dump, be vigorously jolted to shake dirt therefrom, and so forth.

Other objects and advantages will become apparent upon reading the following description in conjunction with the accompanying drawings, wherein, Fig. 1 is a fragmentary side perspective view of a preferred embodiment of this invention.

Fig. 2 is an enlarged side perspective view of a fragment of the embodiment shown in Fig. 1 but shown from the side opposite to that of Fig. 1.

Fig. 3 is a fragmentary side perspective view of the embodiment shown in Fig. 1 but shown from the side opposite to that of Fig. 1 and with operating parts in a different position.

Fig. 4 is a fragmentary sectional view taken on the line 4—4 of Fig. 1.

Fig. 5 is a fragmentary sectional view taken on the line 5—5 of Fig. 4.

Fig. 6 is a sectional view taken on the line 6—6 of Fig. 2.

Similar reference numerals refer to similar parts throughout the several views.

Figure 7:
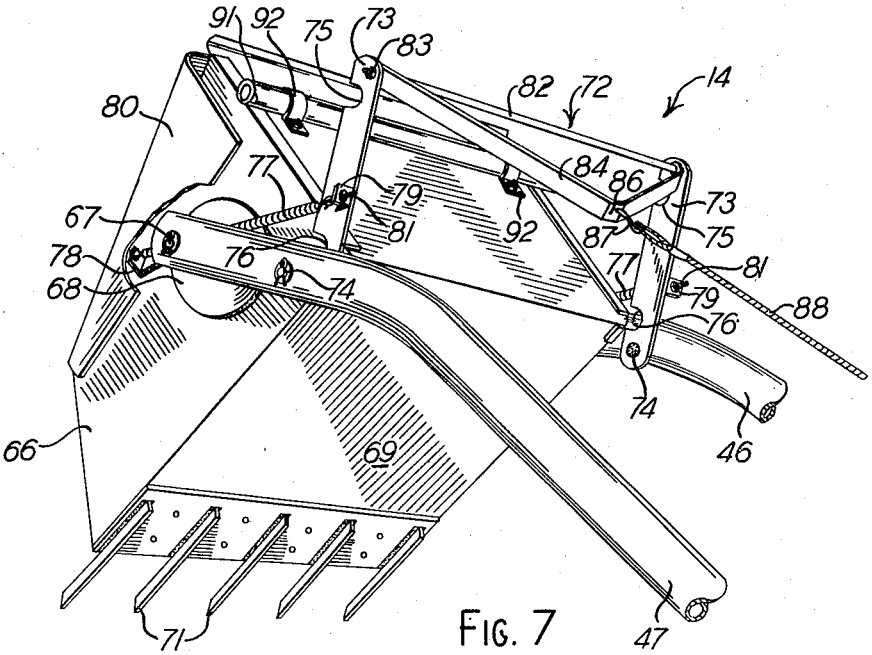
Fig. 7 is an enlarged perspective view of the preferred embodiment of the lift bucket shown in Fig. 1 but with the bucket in the raised and unlocked dumping position.

Fig. 1 shows a rear fragment of a conventional tractor 10 containing the usual pair of rear wheels 11 and their respective fenders 12. An operator's seat 13 is located intermediate the wheels 11 in any well known manner. Mounted onto the rear of the tractor 10, in a manner hereinafter described, is a scoop or lift bucket assembly generally designated 14. In the position shown, the scoop assembly 14 is lowered to the level of the ground and locked in the lifting position. Thus, it should be understood that backing the tractor will cause the assembly 14 to scoop material from the ground, as will be more fully apparent later.

With reference to Figs. 1 and 2, it will be seen that the tractor 10 includes an axle housing 16 which extends horizontally between the wheels 11. A rear wheel axle 17 projects from beyond the ends of the housing 16 to provide a mounting for the wheels 11. For simplicity and clarity of description, the drawings of some of the rear end of the tractor is diagrammatic and, therefore, a transmission housing 18 is as shown mounted on the housing 16 intermediate the wheels 11. Since the tractor is of a conventional construction, it is not deemed necessary to describe it more completely.

Suitably mounted on the tractor 10 is a hydraulic power system 21 which consists of a power cylinder housing 22 and a connecting rod housing 23, the latter of which is attached to horizontally extending shaft housings 24 and 25. It should be understood that the power cylinder contained in the housing 22 is connected to a shaft 30 which is within the housings 24 and 25. Connector arms 27 and 28 are non-rotatably attached to opposite ends of the shaft 30 to extend transversely and generally rearwardly therefrom.

Referring again to the axle housing 16, it will be seen that a pair of mounting brackets 29 are attached to opposite ends of the housing by bolts 31 which attach to plates 32 extending across the bottom of the axle housing 16. The rear ends of the plates 32 project beyond the housing 16 and are turned upwardly to form spaced apart and vertically disposed ends 23. A pin or shaft 34 is horizontally mounted between the ends 33 in holes formed therein to be suitably secured to the plate 32, all in a manner to space the pin 34 above the bottom of the plate 32. In this construction, the rear of the tractor 10 is provided with a pair of the horizontally disposed shafts 34 with one located at each opposite end of the axle housing 16.

Tractor hitch arms 36 and 37 are each mounted on the shafts 34 to project therefrom rearwardly of the tractor 10. The arms 36 and 37 receive the shafts 34 in a hole formed through the end of each of the arms and the latter are thus pivotally mounted onto the tractor 10. It will be further seen that the power system 21 is connected to the hitch arms 36 and 37 by links 38 and 39, respectively. Brackets 41 are preferably welded to the top surfaces of the arms 36 and 37 to pivotally connect to the lower bifurcated ends of the links 38 and 39 by pins 42 as shown. The upper ends of the links 38 and 39 are provided with threaded adjustable sections 43 and 44, respectively, which pivotally attach to the connector arms 27 and 28. With this arrangement, the hitch arms 36 and 37 are pivotally mounted onto the rear end of the tractor 10, and, by operation of the power system 21 which rotates the connector arms 27 and 28 to raise their projecting ends up and down, the hitch arms are consequently raised and lowered at their projecting ends. Of course the threaded sections 43 and 44 of the links 38 and 39 permit independent adjustment of the level of the arms 36 and 37 as desired.

The foregoing description of the mounting and actuation of tractor hitch arms is that of a conventional type of tractor and, therefore, need not be explained further. It should now be observed that the lift bucket assembly 14 is raised and lowered with the hitch arms since the bucket is attached thereto in the preferred manner hereinafter described.

Figs. 2 and 6 best show the important feature of this invention in the preferred manner of mounting a pair of bucket supporting arms 46 and 47 to the hitch arms 36 and 37, respectively. Each of the hitch arms has a spacer plate 48 located at the rear of the arms and transverse thereto. One end of the plate 48 is cradle-shaped to receive a U-shaped reenforcing member 49 which is preferably welded to the plate 48. A pin 50 extends between the upper ends of the U-shaped member and is fastened thereto in a manner to completely enclose the hitch arm and, therefore, the plates 48 move with the hitch arm pivotal movement. The outside ends of the plates 48 are provided with a hole which receives the ends of the bucket support arms and the latter are preferably welded to the plates as at 51. In this manner the arms 46 and 47 are mounted on the hitch arms.

Figs. 4 and 5 show the rear end of the hitch arm 37 provided with an upturned hook 52 and a top pivotal cap 53 meeting therewith. Together, the hook and cap, which are conventional, leave therebetween a space suitable for receiving a horizontally disposed lift pin 54. The latter extends between vertically disposed lift plates 56 and 57 which are attached to the bucket support arms as described in the following. The plates 56 and 57 contain aligned holes 58 which receive the pin 54 in either pair of the two pairs of holes 58 shown. Depending upon the selection of the upper or lower holes, the extended ends of the arms 46 and 47 are raised to a higher or a lesser position. The plates 56 and 57 are preferably welded to a pair of plate brackets 59 which are welded at 60 to the support arms 46 and 47 passing through an opening in the brackets 59. A pair of second plates 61 is positioned opposite to the plates 59 and they also contain openings through which the support arms pass. The plates and the arms are welded together as shown. The lift pin and lift plate construction is the same on both of the arms 46 and 47. A supporting channel member or cross brace 62 is preferably provided and positioned horizontally between the plates 59 and 61 and between the arms 46 and 47 as shown in Figs. 1 and 2. The channel 62 is preferably bolted to the plates 59 and 61 by bolts 63 which pass through all three members, and, as such, the structure is stable and unified.

With particular references to Figs. 1 and 3, and with the foregoing description in mind, it will be apparent that actuation of the hitch arms 36 and 37, through the power system 21, will cause the support arms 46 and 47 to be raised and lowered. The hooked ends 52 of the hitch arms provide an upward support of a cantilever type of load at the outer ends of the support arms 46 and 47. Thus, the hitch arms maintain the support arms upwardly through the lift pins 54 and the connecting plates 59 and 61.

It will be seen that the bucket assembly 14 consists of the arms 46 and 47 which are elongated and tubular and which are slightly bent downwardly at their rear ends. The ends of the arms pivotally support a lift bucket or scoop 66 mounted on trunnions or pivot pins 67 which are located one on each arm and which are mounted in a circular dished plate 68 which is preferably welded to the sides of the bucket 66. The pins 67 are therefore transverse to the opposite sides of the bucket 66. The latter is, of the scoop type in that it consists of three closed sides and a bottom 69 with an open fourth side. To facilitate loading the bucket, the front edge of the bottom 69 is provided with tines 71 which are connected thereto in any suitable manner, such as that shown.

Figure 8:
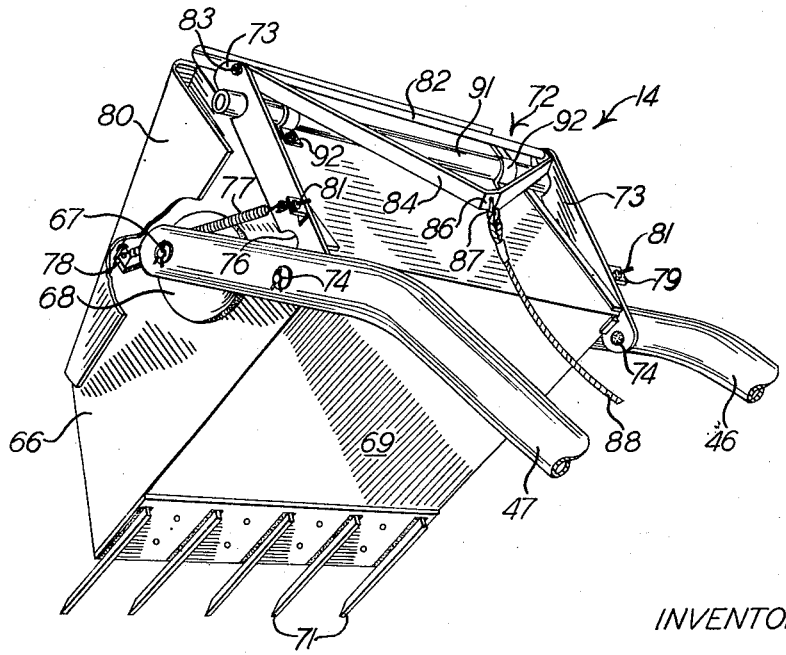
Fig. 8 is a perspective view of the lift bucket shown in Fig. 7 but with the bucket in the locked dumping position.

An important feature of the bucket assembly 14 is the provision of a lock or retainer assembly 72 which is mounted on the arms 46 and 47 to the rear of the bucket 66. As best seen in Figs. 7 and 8, the assembly 72 contains a pair of bucket hooks or latches 73 which are pivotally attached one to the inside of each of the bucket support arms 46 and 47 by pivot pins 74. The forward edges of the latches are provided with upper and lower recesses or notches 75 and 76, respectively, spaced at a predetermined position therealong. A coil spring 77 is connected at one end to a bracket 78 welded to the side of the bucket, and, at the other end, the spring 77 is connected to a bracket 79 welded to the latch 73. It is preferred that a spring 77 and the brackets 78 and 79 be provided on each side of the bucket as shown. The bucket and the latches are thus biased together by the connecting springs 77. It is further preferred that the springs be adjustably connected to the brackets 79 to permit adjustment of spring tension as desired. For this reason the springs are preferably connected to the latches 73 by adjusting bolts 81 as shown. To protect the springs 77 from the material being scooped, it is preferred that a skirt 80 be attached to the top of the scoop side to enclose the springs.

A latch arm spacer rod 82 is preferably attached between the upper ends of the latches 73 to unify the latch assembly and maintain the latches parallel at a predetermined spaced apart distance. The rod 82 passes through the latches and is threaded at its opposite ends to engage nuts 83 on the outsides of the latches and secure the rod to the latches. Suitably attached to the latches, by being mounted onto the rod 82, is a V-shaped strap or connector 84 which is preferably attached to each end of the rod 82 to insure a uniform pivotal actuation of the latches 73. A central portion 86 of the strap has a hook 87 attached thereto to connect to a trip rope 88 or the like. As shown in Figs. 1 and 3, the rope 88 preferably extends from the strap 84 to the tractor seat 13 where it is held by a hook 89 which attaches the rope below the seat for the convenience of the operator.

To complete the description of the scoop latch assembly, a latch retainer 91, shown in Figs. 7 and 8, is attached to the top rear side of the scoop 66. In this embodiment, the retainer 91 can consist of a rod which extends horizontally across the width of the back of the scoop and slightly beyond the opposite sides thereof. A pair of brackets 92 attach the retainer to the scoop since the brackets are riveted or otherwise secured to the bucket and they are formed to partly encircle the rod and retain the same, all in any well known manner.

The operation of the bucket includes the raising of it, from the position shown in Fig. 1 to the position shown in Fig. 3, by the tractor mounting described. In the course of raising the bucket, it is assumed that the bucket or scoop contains material which is being shoveled and, therefore, the bucket retainer assembly is locked in the lift position shown in Figs. 1 and 3. In this position, the bucket latches 73 have their lower notches 76 engaged with the retainer 91. The bucket support trunnions 67 are located on the sides of the bucket to be slightly to the rear of the center of gravity of the loaded bucket. Thus, the trunnions are located between the retainer assembly and the center of gravity of the scoop. In so arranging the bucket pivotal support, it will be obvious that upon release of the latches 73 from their retainer 91 the bucket's forward edge will tip downwardly to the position shown in Figs. 7 and 8, allowing the shoveled material to fall from the bucket. The release of the latch from the retainer is accomplished by the tractor operator pulling on the trip rope 88, as indicated in Fig. 7.

As seen in Fig. 8, release of the rope 88 will permit the springs 77 to return the latches to a position causing engagement between the upper notches 75 and the retainer 91. In this position, the bucket is locked with respect to the tractor and the dumping of the load can be controlled since the bucket is not free to swing. Further, the bucket can be jarred or shaken, by the operation of the tractor lift mechanism, to remove all of the load from the bucket leaving none of it adhering to the bucket. Without locking the bucket in the dumping position of Fig. 8, most of the jarring action of the tractor would lose its effectiveness of shaking the bucket since the bucket would merely swing freely in a substantially uniform motion.

After the bucket is emptied, it can be restored to the shoveling position by the operator pulling on the rope 88. The initial pull will unlatch the retainer and a further pull will cause the bucket to rotate about the trunnions 67 to return to the position shown in Figs. 1 and 3. This rotation is accomplished through the rope pull which is transmitted to the springs 77 and then to the bucket. When the bucket has so returned, the retainer 91 will be received within the lower notches 76 of the latches 73, and again the bucket is locked in position. An alternative method of repositioning the bucket is to place the bucket on the ground as shown in Fig. 1 and thereby allow it to rotate about the trunnions without pulling it through the springs 77. When the downward movement of the bucket support arms has been adequate to rotate the bucket to the shoveling or digging position, the latches 73 are then reengaged with the retainer 91.

As mentioned at the outset, the bucket can also be used for scraping of either the ground or the material being shoveled. In that operation, the bucket is locked in the dumping position of Fig. 8 and it is of course lowered to the scraping position. It may be preferred that the tines 71 be removed from the bucket as the scraping will be done with that edge of the bucket. Since the bucket can be positively locked in the dumping position, it provides a means for scraping in either the forward or the rearward direction of tractor movement.

While a specific embodiment of this invention has been shown and described, the scope of the invention should be limited only by the appended claims.

I claim:

1. On a tractor having a pair of laterally-spaced, rearwardly-extending longitudinal hitch arms pivoted on said tractor for movement in vertical planes, and terminating rearwardly in hitch claws, in combination, a pair of scoop-support arms, one spaced outwardly closely adjacent each of said hitch arms generally parallel thereto, said scoop-support arms provided forwardly with lateral upwardly-open saddle means for engagement with said hitch arms, a transverse member, each end thereof secured integrally to one of said scoop-support arms, depending brackets on said transverse member adjacent said claws and transverse pins passing through said brackets and said claws.

2. On a tractor having a pair of laterally-spaced, rearwardly-extending longitudinal hitch arms pivoted on said tractor for movement in vertical planes, and terminating rearwardly in hitch claws, in combination, a pair of scoop-support arms, one spaced outwardly adjacent each of said hitch arms and generally parallel thereto, said scoop-support arms provided forwardly with lateral saddle means for engaging said hitch arms from below, a transverse member secured normally and integrally between said scoop-support arms providing a laterally rigid frame, depending brackets on said transverse member adjacent said claws and transverse means engaging said brackets and said claws for cooperative laterally-rigid, vertical movement.

3. On a tractor having a pair of laterally-spaced, rearwardly-extending longitudinal hitch arms pivoted on said tractor for movement in vertical planes, and terminating rearwardly in hitch claws, in combination, a pair of rearwardly-extending scoop-support arms, one spaced outwardly adjacent each of said hitch arms, said scoop support arms secured forwardly to said hitch arms, a transverse member securing said scoop-support arms together as an integral laterally rigid unit rearwardly of said claws, depending brackets adjacent said claws and secured to said transverse member, and hitch means on said brackets to engage said claws.

4. On a tractor having a pair of laterally-spaced, rearwardly-extending longitudinal hitch arms pivoted on said tractor for movement in vertical planes, and terminating rearwardly in hitch claws, in combination, a pair of scoop-support arms, one spaced adjacent each of said hitch arms, and provided forwardly with upwardly-open saddle means for securing said hitch arms therein, a transverse member secured integrally between said scoop-support arms and normal thereto, brackets adjacent said claws and secured to said transverse member, and means to secure said claws in said brackets for lifting engagement therewith.

5. On a tractor having a pair of laterally-spaced rearwardly-extending hitch arms pivoted on said tractor for movement in vertical planes and terminating rearwardly in hitch means, in combination, a pair of scoop-supporting arms, one outwardly adjacent and generally parallel to each of said hitch arms, said scoop-support arms secured at their forward extremities to said hitch arms by means of an upwardly-open saddle, a transverse member extending normally to said support arms and integrally secured thereto, bracket means secured to said transverse member and associated with said hitch means so as to limit said support arms to movement in vertical planes.

References Cited in the file of this patent

UNITED STATES PATENTS

| | | |
|---|---|---|
| 2,341,007 | Wommer | Feb. 8, 1944 |
| 2,398,585 | Hayward | Apr. 16, 1946 |
| 2,543,496 | Holopainen | Feb. 27, 1951 |